United States Patent
Zhang et al.

(10) Patent No.: US 11,999,846 B2
(45) Date of Patent: Jun. 4, 2024

(54) POLYPROPYLENE BOARD AND METHOD FOR PREPARING SAME

(71) Applicant: CHANGZHOU BEMATE HOME TECHNOLOGY CO., LTD., Jiangsu (CN)

(72) Inventors: Xiaoling Zhang, Jiangsu (CN); Zhiyuan Xiao, Jiangsu (CN); Yanhui Li, Jiangsu (CN)

(73) Assignee: CHANGZHOU BEMATE HOME TECHNOLOGY CO., LTD., Changzhou (CN)

( * ) Notice: Subject to any disclaimer, the term of this patent is extended or adjusted under 35 U.S.C. 154(b) by 205 days.

(21) Appl. No.: 17/527,371

(22) Filed: Nov. 16, 2021

(65) Prior Publication Data

US 2022/0073726 A1 Mar. 10, 2022

Related U.S. Application Data

(63) Continuation of application No. PCT/CN2021/129029, filed on Nov. 5, 2021.

(30) Foreign Application Priority Data

Nov. 12, 2020 (CN) .......................... 202011259327.2

(51) Int. Cl.
- *C08L 51/06* (2006.01)
- *C08L 23/14* (2006.01)
- *E04F 15/10* (2006.01)

(52) U.S. Cl.
CPC .............. *C08L 51/06* (2013.01); *C08L 23/14* (2013.01); *E04F 15/102* (2013.01); *C08L 2205/02* (2013.01)

(58) Field of Classification Search
CPC ........ C08K 2003/262; C08K 2003/328; C08L 2205/02; C08L 23/14; C08L 51/06; C08L 91/06; C12Q 1/6827; C12Q 1/6869; C12Q 1/6876; C12Q 1/6883; C12Q 1/6886; C12Q 2600/156; E04F 15/102; E04F 15/105; G16B 20/00; G16B 20/10; G16B 20/20; G16B 25/00; G16B 25/10; G16B 30/00; G16B 30/10; G16B 40/00
See application file for complete search history.

(56) References Cited

FOREIGN PATENT DOCUMENTS

| CN | 101624459 | * | 1/2010 | ............. C08L 51/06 |
|----|-----------|---|--------|-------------------------|
| CN | 106366457 | A | 2/2017 | |
| CN | 106397990 | A | 2/2017 | |
| CN | 106587720 | A | 4/2017 | |
| CN | 108822398 | A | 11/2018 | |
| CN | 109025165 | A | 12/2018 | |
| CN | 111205637 | A | 5/2020 | |
| CN | 111320816 | A | 6/2020 | |
| CN | 111456374 | A | 7/2020 | |
| CN | 112341714 | A | 2/2021 | |

* cited by examiner

*Primary Examiner* — Lawrence D Ferguson

(57) ABSTRACT

The disclosure relates to the manufacturing of floors, and more particularly to a polypropylene board and a method for preparing the same. The polypropylene board is prepared from 25-40 parts by weight of a modified polypropylene resin, 30-70 parts by weight of a filler, 3-10 parts by weight of a stabilizer and 1-8 parts by weight of a lubricant. A melt flow rate of the modified polypropylene resin is 2-9 g/10 min.

12 Claims, No Drawings

POLYPROPYLENE BOARD AND METHOD FOR PREPARING SAME

CROSS-REFERENCE TO RELATED APPLICATIONS

This application is a continuation of International Patent Application No. PCT/CN2021/129029, filed on Nov. 5, 2021, which claims the benefit of priority from Chinese Patent Application No. 202011259327.2, filed on Nov. 12, 2020. The content of the aforementioned application, including any intervening amendments thereto, is incorporated herein by reference in its entirety.

TECHNICAL FIELD

This disclosure relates to the manufacturing of floors, and more particularly to a polypropylene board and a method for preparing the same.

BACKGROUND

The polyvinyl chloride (PVC) floor, also known as "lightweight floor material", has been widely used in the floor decoration. In the preparation of the PVC floor, PVC and co-polymer resins thereof used as main raw materials are compounded with auxiliary materials, such as fillers, plasticizers, stabilizers, and colorants, and then subjected to coating, calendering, or extrusion on a continuous sheet substrate to prepare the PVC floor. Unfortunately, the exiting PVC floor cannot meet the requirements of environmental protection due to the volatilization of toxic gases and the presence of plasticizers. Therefore, it is of great significance to develop a floor material free of PVC and plasticizers.

Polypropylene (PP) materials are readily available, and have low cost and good gloss. Moreover, the PP materials are free of toxicity and peculiar smell. However, the existing PP board cannot be fully mixed with the fillers such that the extrusion molding cannot be smoothly completed and the product is prone to delamination, which restricts the large-scale production and application of the PP board.

SUMMARY

An object of the present disclosure is to provide a polypropylene board and a method for preparing the same to smoothly complete the extrusion molding of polypropylene boards in the absence of a plasticizer.

Technical solutions of this disclosure are described as follows.

In a first aspect, this disclosure provides a polypropylene board, wherein the polypropylene board is prepared from 25-40 parts by weight of a modified polypropylene resin, 30-70 parts by weight of a filler, 3-10 parts by weight of a stabilizer and 1-8 parts by weight of a lubricant; and
    a melt flow rate (MFR) of the modified polypropylene resin is 2-9 g/10 min.

In an embodiment, the polypropylene board is prepared from 30-36 parts by weight of the modified polypropylene resin, 30-70 parts by weight of the filler, 5-8 parts by weight of the stabilizer and 2-5 parts by weight of the lubricant; and
    the melt flow rate of the modified polypropylene resin is 4-7 g/10 min.

In an embodiment, the modified polypropylene resin is selected from the group consisting of a polyolefin-modified polypropylene resin, an acrylic acid-grafted polypropylene resin and a combination thereof. In an embodiment, the modified polypropylene resin comprises 15-18 parts by weight of the polyolefin-modified polypropylene resin and 15-18 parts by weight of the acrylic acid-grafted polypropylene resin.

In an embodiment, the filler is selected from the group consisting of calcium carbonate, kaolin, ferric oxide and a combination thereof; and a fineness of the filler is 400-800 mesh.

In an embodiment, the stabilizer is selected from the group consisting of acrylic acid, zinc phosphate and a combination thereof, preferably zinc phosphate.

In an embodiment, the lubricant is selected from the group consisting of zinc fatty acid, polyethylene wax and a combination thereof.

In a second aspect, this disclosure provides a method for preparing the polypropylene board, comprising:
    subjecting a mixture of the above raw materials to extrusion molding to prepare the polypropylene board.

In an embodiment, the method further comprises:
    before the extrusion molding, subjecting the raw materials to blending and kneading to obtain the mixture of the raw materials;
    wherein a kneading temperature is 70-80° C., and a kneading time is more than 60 s; and the extrusion molding is performed at 190-200° C.

In an embodiment, the method further comprises:
    after the extrusion molding, subjecting an extrusion molded product sequentially to lamination, cooling and quenching;
    wherein the lamination is performed by laminating a polypropylene color film and a polypropylene wear-resistant layer on the extrusion molded product to obtain the polypropylene board with the polypropylene color film, the polypropylene wear-resistant layer and a polypropylene substrate arranged successively.

In an embodiment, a thickness of the polypropylene board is 5-10 mm; a thickness of the polypropylene substrate is 4-8 mm, preferably 4-6 mm; a thickness of the polypropylene color film is 0.02-0.08 mm, preferably 0.06-0.08 mm; a thickness of the polypropylene wear-resistant layer is 0.15-0.8 mm, preferably 0.35-0.55 mm; and the polypropylene wear-resistant layer has a haze less than 10% and a light transmittance larger than 92%.

The beneficial effects of the present disclosure are described below.

With respect to the polypropylene board provided herein, the raw material composition is optimized by introducing a modified polypropylene resin with a melt flow rate of 2-9 g/10 min, a filler, a stabilizer, and a lubricant. Moreover, the amount of individual raw materials is regulated such that the polypropylene board can be fabricated by extrusion molding in the absence of a plasticizer, and the delamination will not occur.

In the method provided herein for preparing the polypropylene board, the raw material formula is optimized such that the polypropylene board can be fabricated by extrusion molding in the absence of a plasticizer, and is not prone to delamination.

DETAILED DESCRIPTION OF EMBODIMENT

To render the objects, technical solutions, and advantages of the present disclosure clearer, the present disclosure will be clearly and completely described below with reference to the embodiments. Unless otherwise specified, the operations in the following embodiments are carried out under the conventional conditions or the conditions recommended by the manufacturer, and the reagents or instruments used below are commercially available.

A polypropylene board and a method for preparing the same will be specifically illustrated below.

The polypropylene board provided herein is prepared from 25-40 parts by weight of a modified polypropylene resin, 30-70 parts by weight of a filler, 3-10 parts by weight of a stabilizer and 1-8 parts by weight of a lubricant, where a melt flow rate of the modified polypropylene resin is 2-9 g/10 min.

It should be noted that the traditional PP material is a non-polar material, and has a symmetrical molecular structure, which is not conducive to the electron transfer. The poor electron transfer efficiency results in a poor energy transfer effect, such that PP molecules and powdered materials (filler) cannot be fully mixed, resulting in the delamination between the powder material and the PP resin after extrusion.

It has been found that the molding effect can be significantly improved by selecting a modified polypropylene resin with a melt flow rate of 2-9 g/10 min. When the melt flow rate is larger than 9 g/10 min, the modified polypropylene resin is prone to flowing out and will not be molded. When the melt flow rate is lower than 2 g/10 min, the modified polypropylene resin is not easy to be sheared, leading to poor mixing uniformity. When the melt flow rate is 2-9 g/10 min, the modified polypropylene resin can be mixed uniformly with other auxiliary materials and is easy to be molded after melted.

It should be noted that the polypropylene board provided herein is free of a plasticizer, so it can meet the requirements of environmental protection, having a brilliant application prospect.

To obtain a better molding effect, the amount of individual raw materials is further optimized. In an embodiment, the raw materials include 30-36 parts by weight of the modified polypropylene resin, 30-70 parts by weight of the filler, 5-8 parts by weight of the stabilizer, and 2-5 parts by weight of the lubricant, where the melt flow rate of the modified polypropylene resin is 4-7 g/10 min.

In an embodiment, the modified polypropylene resin is selected from the group consisting of a polyolefin-modified polypropylene resin, an acrylic acid-grafted polypropylene resin and a combination thereof, preferably a combination of 15-18 parts by weight of the polyolefin-modified polypropylene resin and 15-18 parts by weight of the acrylic acid-grafted polypropylene resin. In an embodiment, the polyolefin-modified polypropylene resin is VM3588 with a polymerization degree of about 800-1000, and the acrylic acid-grafted polypropylene resin is VM3980 with a molecular weight of about 850-1200.

In an embodiment, the filler is selected from the group consisting of calcium carbonate, kaolin, ferric oxide and a combination thereof. The above inorganic filler is apt to be mixed with the modified polypropylene resin, improving the molding effect. To increase the mixing uniformity of the filler and the modified polypropylene resin, the fineness of the filler is controlled to be 400-800 mesh.

In an embodiment, the stabilizer is selected from the group consisting of acrylic acid, zinc phosphate and a combination thereof, preferably zinc phosphate. The presence of zinc phosphate can increase the stability of the mixed system and thus improve the stability of the final product.

In an embodiment, the lubricant is selected from the group consisting of zinc fatty acid, polyethylene wax and a combination thereof. These lubricants are all commercially available, and the presence of the lubricant can further increase the mixing uniformity of the components, thereby improving the molding effect of the polypropylene board.

In some embodiments, the filler, stabilizer and lubricant are not limited to the above, and are not specifically listed herein.

A method for preparing the polypropylene board is also provided herein, which includes:

subjecting a mixture of the raw materials to extrusion molding to produce the polypropylene board.

In this preparation process, the polypropylene board can be extruded and molded in the absence of a plasticizer by modifying the raw material formula, so that the obtained product is environmentally friendly.

In an embodiment, the preparation method further includes:

before the extrusion molding, subjecting the raw materials to blending and kneading to obtain the mixture of the raw materials; where the kneading process can facilitate the uniform mixing of the raw materials.

In an embodiment, a kneading temperature is 70-80° C.; a kneading time is more than 60 s; and the extrusion molding is performed at 190-200° C. The operating temperature is controlled to make the modified PP material have a better melting effect and a higher fluidity such that it is easier to complete the extrusion molding.

In an embodiment, the preparation method further includes:

after the extrusion molding, subjecting a polypropylene substrate obtained from the extrusion molding to lamination, cooling and quenching in sequence to prepare the polypropylene board, where the laminating process is performed by laminating a polypropylene color film and a polypropylene wear-resistant layer on the polypropylene substrate to obtain the polypropylene board with the polypropylene color film, the polypropylene wear-resistant layer and the polypropylene substrate arranged successively. These processes are not described in detail herein, and the specific conditions can refer to the related existing technology. The polypropylene color film and the polypropylene wear-resistant layer are currently available. By means of the hot lamination, the combination of the polypropylene color film, the polypropylene wear-resistant layer and the polypropylene substrate is enabled.

In an embodiment, a thickness of the polypropylene board is 5-10 mm; a thickness of the polypropylene substrate is 4-8 mm, preferably 4-6 mm; a thickness of the polypropylene color film is 0.02-0.08 mm, preferably 0.06-0.08 mm; a thickness of the polypropylene wear-resistant layer is 0.15-0.8 mm, preferably 0.35-0.55 mm; and the polypropylene wear-resistant layer has a haze less than 10%, and a light transmittance more than 92%. By further controlling the thicknesses of the polypropylene substrate, the polypropylene wear-resistant layer and the polypropylene color film, the synchronization between layers can be enhanced, facilitating the installation and transportation.

It should be noted that if the thickness is more than 6 mm, the polypropylene board will have a relatively large weight, hindering the installation and transportation. A thicker substrate layer and a thinner wear-resistant layer will lead to a better synchronization between the layers, promoting the stability of the polypropylene board.

The method provided herein has the following advantages.

(1) The preparation process does not involve any plasticizers, antioxidants, vulcanizers and colorants, so the PP board prepared thereby is free of carcinogens, and is not harmful to human health, meeting the requirements of environmentally friendly products.

(2) In the absence of plasticizers, the PP materials are more stable and homogeneous.

(3) Each layer of the PP floor uses the PP material as the raw material such that the whole PP floor is free of toxicity and peculiar smell, and does not involve the volatilization of toxic gases.

(4) The scrapped PP floor and the wastes generated in the production process can be reused, and the performance can be still maintained at a relatively high level during the secondary use.

The characteristics and performance of the present disclosure will be described in detail below with reference to the embodiments.

Example 1

Provided herein was a polypropylene board, which was prepared from 25 parts by weight of a modified polypropylene resin, 30 parts by weight of calcium carbonate, 3 parts by weight of zinc phosphate and 1 part by weight of polyethylene wax, where a melt flow rate of the modified polypropylene resin was 2 g/10 min, and the modified polypropylene resin was a polyolefin-modified polypropylene resin.

A method for preparing the polypropylene board was also provided, which was described specifically below.

The raw materials for preparing the polypropylene board were subjected to blending, kneading at 70° C. for 2 min, and extrusion molding at 190° C. to obtain a polypropylene substrate. The polypropylene substrate was subjected to hot-laminating, cooling and quenching to obtain the PP board, where the hot-laminating was performed by laminating a polypropylene color film and a polypropylene wear-resistant layer on the polypropylene substrate. A thickness of the polypropylene substrate was 4 mm. A thickness of the polypropylene color film was 0.02 mm. A thickness of the polypropylene wear-resistant layer was 0.15 mm. The polypropylene wear-resistant layer had a haze less than 10%, and a light transmittance larger than 92%.

Example 2

Provided herein was a polypropylene board, which was prepared from 40 parts by weight of a modified polypropylene resin, 70 parts by weight of kaolin, 10 parts by weight of acrylic acid and 8 parts by weight of zinc fatty acid, where a melt flow rate of the modified polypropylene resin was 9 g/10 min, and the modified polypropylene resin was an acrylic acid-grafted polypropylene resin.

A method for preparing the polypropylene board was also provided, which was described specifically below.

The raw materials for preparing the polypropylene board were subjected to blending, kneading at 70° C. for 2 min, and extrusion molding at 190° C. to obtain a polypropylene substrate. The polypropylene substrate was subjected to hot-laminating, cooling and quenching to obtain the PP board, where the hot-laminating was performed by laminating a polypropylene color film and a polypropylene wear-resistant layer on the polypropylene substrate. A thickness of the polypropylene substrate was 8 mm. A thickness of the polypropylene color film was 0.08 mm. A thickness of the polypropylene wear-resistant layer was 0.8 mm. The polypropylene wear-resistant layer had a haze less than 10%, and a light transmittance more than 92%.

Example 3

Provided herein was a polypropylene board, which was prepared from 30 parts by weight of a modified polypropylene resin, 30 parts by weight of calcium carbonate, 5 parts by weight of zinc phosphate and 2 parts by weight of polyethylene wax, where a melt flow rate of the modified polypropylene resin was 4 g/10 min, and the modified polypropylene resin was composed of 15 parts by weight of a polyolefin-modified polypropylene resin and 15 parts by weight of an acrylic acid-grafted polypropylene resin.

A method for preparing the polypropylene board was also provided, which was described specifically below.

The raw materials of the polypropylene board were subjected to blending, kneading at 70° C. for 2 min, and extrusion molding at 190° C. to obtain a polypropylene substrate. The polypropylene substrate was subjected to hot-laminating, cooling and quenching to obtain the PP board, where the hot-laminating was performed by laminating a polypropylene color film and a polypropylene wear-resistant layer on the polypropylene substrate. A thickness of the polypropylene substrate was 4 mm. A thickness of the polypropylene color film was 0.06 mm. A thickness of the polypropylene wear-resistant layer was 0.35 mm. The polypropylene wear-resistant layer had a haze less than 10%, and a light transmittance more than 92%.

Example 4

Provided herein was a polypropylene board, which was prepared from 36 parts by weight of a modified polypropylene resin, 70 parts by weight of calcium carbonate, 8 parts by weight of zinc phosphate and 5 parts by weight of polyethylene wax, where a melt flow rate of the modified polypropylene resin was 7 g/10 min, and the modified polypropylene resin was composed of 18 parts by weight of a polyolefin-modified polypropylene resin and 18 parts by weight of an acrylic acid-grafted polypropylene resin.

A method for preparing the polypropylene board was also provided, which was described specifically below.

The raw materials of the polypropylene board were subjected to blending, kneading at 70° C. for 2 min, and extrusion molding at 190° C. to obtain a polypropylene substrate. The polypropylene substrate was subjected to hot-laminating, cooling and quenching to obtain the PP board, where the hot-laminating was performed by laminating a polypropylene color film and a polypropylene wear-resistant layer on the polypropylene substrate. A thickness of the polypropylene substrate was 6 mm. A thickness of the polypropylene color film was 0.08 mm. A thickness of the polypropylene wear-resistant layer was 0.55 mm. The polypropylene wear-resistant layer had a haze less than 10%, and a light transmittance more than 92%.

Comparative Example 1

Provided herein was a polypropylene board, which was different from the polypropylene board prepared in Example 1 merely in the modified polypropylene resin. Specifically, the melt flow rate of the modified polypropylene resin used herein was 1 g/10 min.

A method for preparing the polypropylene board was further provided herein, and reference can be made to Example 1 for the specific procedures.

Comparative Example 2

Provided herein was a polypropylene board, which was different from the polypropylene board prepared in Example 1 merely in the melt flow rate of the modified polypropylene resin. Specifically, the melt flow rate of the modified polypropylene resin used herein was 10 g/10 min.

A method for preparing the polypropylene board was further provided herein, and reference can be made to Example 1 for the specific procedures.

Comparative Example 3

Provided herein was a polypropylene board, which was different from the polypropylene board prepare in Embodiment 1 merely in the addition of 2 parts by weight of a plasticizer. It was found that the plasticizing effect was not obvious because the plasticizing effect of the group free of the plasticizer can also meet the requirement, and no obvious change was observed in the flow velocity.

Experimental Example

The molding effects of the polypropylene boards prepared in Examples 1~4 and Comparative Examples 1-2 were tested. It was found that in Examples 1-4, the polypropylene boards could be smoothly prepared by extrusion molding without delamination, and moreover, the polypropylene boards in Examples 3-4 had better molding effects. By comparison, in Comparative Examples 1-2, the polypropylene boards could not be smoothly molded.

In summary, the disclosure optimizes the composition of the raw materials of the polypropylene board. Specifically, a modified polypropylene resin with a melt flow rate of 2-9 g/10 min, a filler, a stabilizer and a lubricant were used as raw materials. Moreover, the amount of each raw material is regulated such that the polypropylene board can be smoothly fabricated by extrusion molding in the absence of a plasticizer, and will not experience delamination.

In the method provided herein for preparing the polypropylene board, the raw material formula is modified such that the polypropylene plate can be molded by extrusion in the absence of the plasticizer, and the delamination will not occur.

Described above are merely some embodiments of the present disclosure, which are not intended to limit the present disclosure. It should be understood that other embodiments obtained by those skilled in the art based on the embodiments provided herein without paying any creative effort should fall within the scope of the present disclosure defined by the appended claims.

What is claimed is:

1. A polypropylene board, wherein the polypropylene board is prepared from 25-40 parts by weight of a modified polypropylene resin, 30-70 parts by weight of a filler, 3-10 parts by weight of a stabilizer and 1-8 parts by weight of a lubricant; and a melt flow rate of the modified polypropylene resin is 2-9 g/10 min;
wherein the stabilizer is selected from the group consisting of acrylic acid, zinc phosphate and a combination thereof.

2. The polypropylene board of claim 1, wherein the polypropylene board is prepared from 30-36 parts by weight of the modified polypropylene resin, 30-70 parts by weight of the filler, 5-8 parts by weight of the stabilizer and 2-5 parts by weight of the lubricant; and the melt flow rate of the modified polypropylene resin is 4-7 g/10 min.

3. The polypropylene board of claim 1, wherein the modified polypropylene resin is selected from the group consisting of a polyolefin-modified polypropylene resin, an acrylic acid-grafted polypropylene resin and a combination thereof.

4. The polypropylene board of claim 3, wherein the modified polypropylene resin comprises 15-18 parts by weight of the polyolefin-modified polypropylene resin and 15-18 parts by weight of the acrylic acid-grafted polypropylene resin; and a model of the polyolefin-modified polypropylene resin is VM3588, and a model of the acrylic acid-grafted polypropylene resin is VM3980.

5. The polypropylene board of claim 1, wherein the filler is selected from the group consisting of calcium carbonate, kaolin, ferric oxide and a combination thereof; and a fineness of the filler is 400-800 mesh.

6. The polypropylene board of claim 1, wherein the stabilizer is zinc phosphate.

7. A polypropylene board, wherein the polypropylene board is prepared from 25-40 parts by weight of a modified polypropylene resin, 30-70 parts by weight of a filler, 3-10 parts by weight of a stabilizer and 1-8 parts by weight of a lubricant; and a melt flow rate of the modified polypropylene resin is 2-9 g/10 min;
wherein the lubricant is selected from the group consisting of zinc fatty acid, polyethylene wax and a combination thereof.

8. A method for preparing a polypropylene board, comprising:
subjecting a mixture of 25-40 parts by weight of a modified polypropylene resin, 30-70 parts by weight of a filler, 3-10 parts by weight of a stabilizer and 1-8 parts by weight of a lubricant to extrusion molding to prepare the polypropylene board;
wherein a melt flow rate of the modified polypropylene resin is 2-9 g/10 min.

9. The method of claim 8, further comprising:
before the extrusion molding, subjecting the modified polypropylene resin, the filler, the stabilizer and the lubricant to blending and kneading to obtain the mixture;
wherein a kneading temperature is 70-80° C., and a kneading time is more than 60 s; and the extrusion molding is performed at 190-200° C.

10. The method of claim 9, further comprising:
after the extrusion molding, subjecting a polypropylene substrate obtained from the extrusion molding to lamination, cooling and quenching;
wherein the lamination is performed by laminating a polypropylene color film and a polypropylene wear-resistant layer on the polypropylene substrate to obtain the polypropylene board with the polypropylene color film, the polypropylene wear-resistant layer and the polypropylene substrate arranged successively.

11. The method of claim 10, wherein a thickness of the polypropylene board is 5-10 mm; a thickness of the polypropylene substrate is 4-8 mm; a thickness of the polypropylene color film is 0.02-0.08 mm; a thickness of the polypropylene wear-resistant layer is 0.15-0.8 mm; and a haze of the polypropylene wear-resistant layer is less than 10%, and a light transmittance of the polypropylene wear-resistant layer is more than 92%.

12. The method of claim 11, wherein the thickness of the polypropylene substrate is 4-6 mm; the thickness of the polypropylene color film is 0.06-0.08 mm; and the thickness of the polypropylene wear-resistant layer is 0.35-0.55 mm.

\* \* \* \* \*